Jan. 16, 1934.  G. EGE  1,943,955

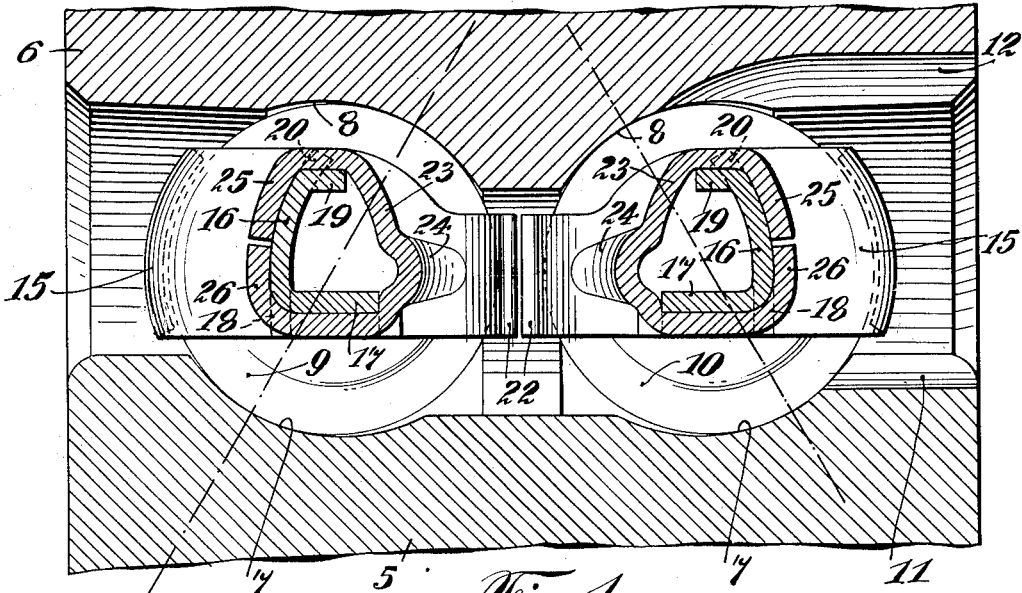
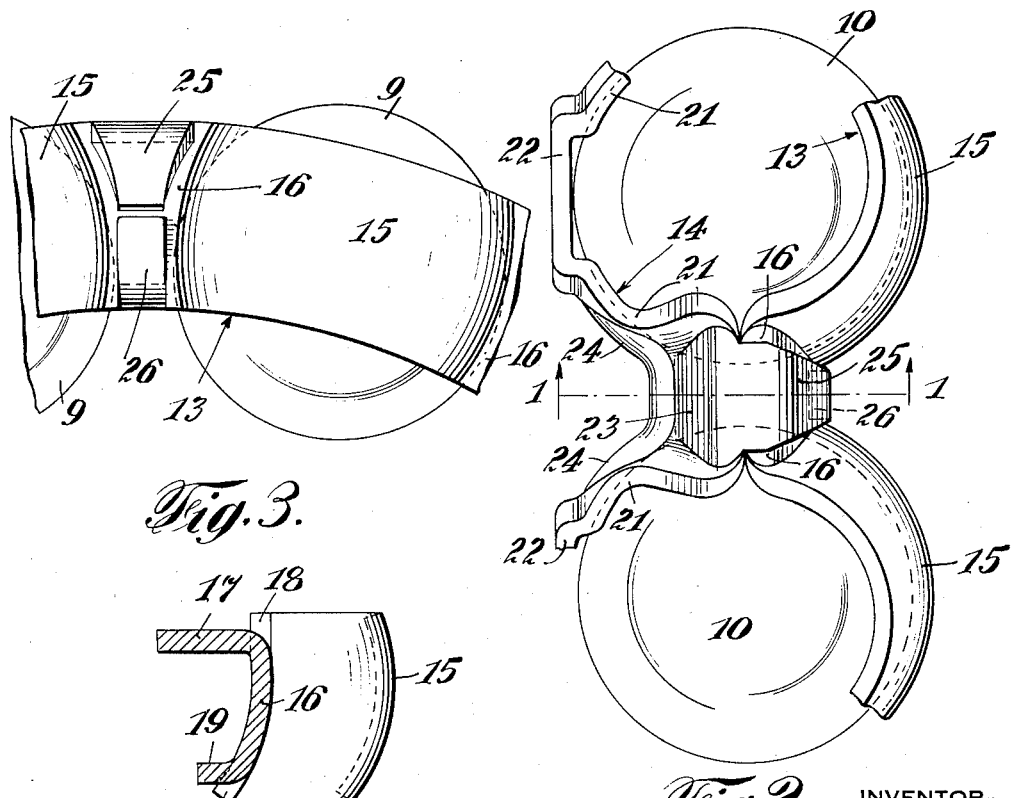

BALL BEARING CAGE

Filed May 10, 1932  2 Sheets-Sheet 2

INVENTOR-
Gustav Ege
BY
his ATTORNEY-

Patented Jan. 16, 1934

1,943,955

UNITED STATES PATENT OFFICE 1,943,955

BALL BEARING CAGE

Gustav Ege, Stamford, Conn., assignor to Norma-Hoffman Bearings Corporation, Stamford, Conn., a corporation of New York Application May 10, 1932. Serial No. 610,339

12 Claims. (Cl. 308—201)

This invention relates to ball bearing cages and has for its general object and purpose to provide a cage comprising two complementary rings or sections of light sheet metal with mutually co-acting means on said sections which may be very easily and quickly adjusted and positioned to produce a cage structure having maximum stiffness and resistance to both circumferential and axial strains tending to displace the co-acting parts and permit of relative movement of the cage sections. There is thus secured the desired quietness of operation with a minimum of friction between the balls and the cage and an accurately uniform spacing of the balls between the bearing race surfaces.

It is a more particular object of my invention to provide a bearing cage as above characterized which is particularly designed for use in connection with double row angular contact ball bearings wherein the inner and outer bearing rings are of one piece construction, the innermost opposed sections of the two cages being provided with parts in line with the respective cage pockets which, after one cage has been assembled in one side of the bearing, provide cooperative contacting parts which facilitates the quick and accurate assemblage of the balls and cage sections in the other side of the bearing.

One of the important detail features of my invention is to provide the cage sections between the ball receiving recesses or pockets thereof with co-acting parts whereby said sections may be accurately aligned axially of the cage and which are adjustable into co-acting engagement by means of a simple tool to produce a rigid connection of the cage sections between the adjacent pockets of general ovoid form in cross section and having its longer dimension parallel to the plane of rotation of the rotary bearing ring.

With the above and other objects in view, the invention consists in the improved cage for ball bearings, and in the form, construction and relative arrangement of its several parts, as will be hereinafter more fully described, illustrated in the accompanying drawings and subsequently incorporated in the subjoined claims.

In the drawings wherein I have disclosed one simple and practical embodiment of my invention, and in which similar reference characters designate corresponding parts throughout the several views, Figure 1 is an enlarged diametrical sectional view, through one side of a double row angular contact type ball bearing having my improved cages associated therewith, the sectional plane through the cages being indicated by the line 1—1 in Fig. 2 of the drawings.

Fig. 2 is a fragmentary plan view of the connected cage sections;

Fig. 3 is a fragmentary side elevation of the cage;

Fig. 6 is a detail section on an enlarged scale taken on the line 6—6 of Fig. 4;

Figures 4, 5:
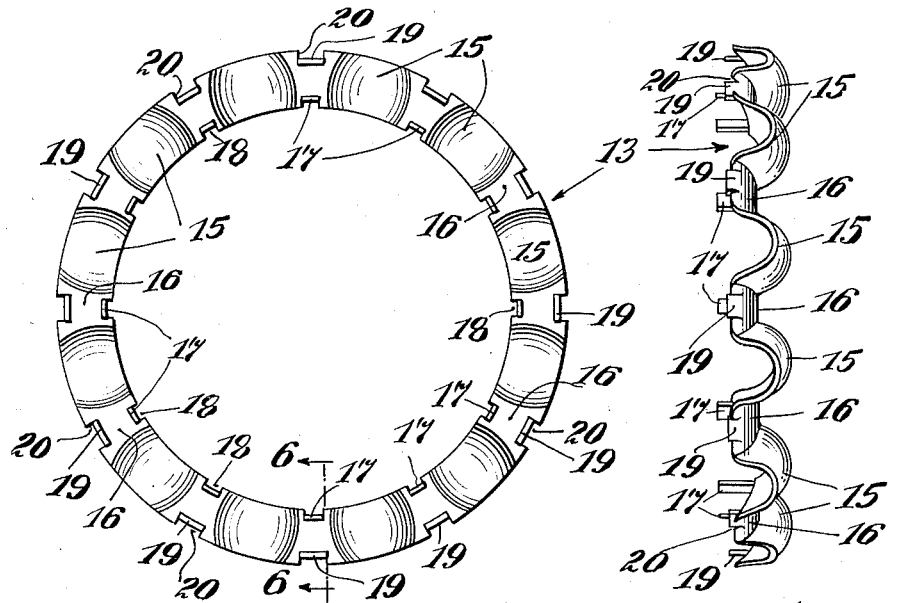
Fig. 4 is an inner side elevation of one of the cage rings or sections.
Fig. 5 is an edge view thereof.
Figures 7, 8:
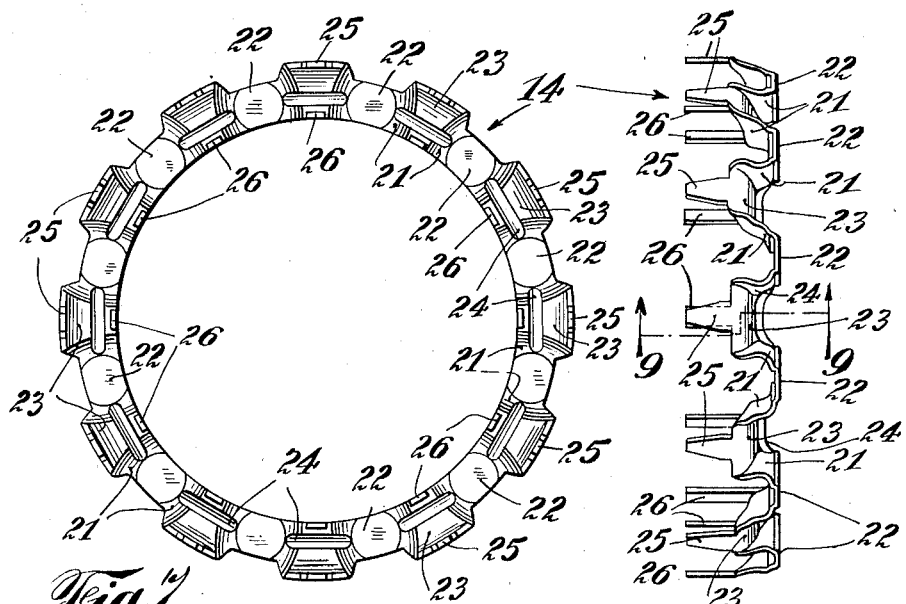
Fig. 7 is an inner side elevation of the other cage ring or section.
Fig. 8 is an edge view thereof.

For the purpose of illustrating one practical application of my new bearing cage construction, in Fig. 1 of the drawings, I have shown the inner and outer bearing rings or members 5 and 6 respectively provided in their opposed faces and at opposite sides of the central median plane with the circumferential races 7 and 8 respectively receiving the two rows of bearing balls as indicated at 9 and 10.

At one lateral side of the rings 5 and 6, the opposed faces thereof are formed with the grooves 11 and 12 respectively leading to the races 7 and 8 and through which the bearing balls 10 are adapted to be successively inserted and engaged with said races, as will be hereinafter more particularly referred to.

The bearing balls in each row are retained in uniformly spaced apart relation circumferentially of the bearing by means of a cage. This cage, as will be seen from reference to Figs. 4 to 8 of the drawings, comprises two complementary rings or sections 13 and 14 respectively which are die stamped or pressed from sheet metal stock of suitable gauge or thickness. The ring section 13 is thereby formed with a plurality of circumferentially spaced ball receiving pockets or recesses indicated at 15, the walls of these ball pockets being curved, both diametrically and circumferentially of the ring, and substantially in concentric relation to the periphery of the ball to be received therein. The walls of adjacent pockets 15 at the open sides thereof are connected with each other by means of the parts 16, which also curve radially of the cage ring in more or less eccentric relation to the walls of said pockets. Each of the parts 16 is provided at the inner edge of the cage ring with an arm 17 projecting axially of the ring from the inner side thereof and disposed in a plane inwardly spaced from the plane of the inner edge of the ring to thereby form the notch or recess 18 in said inner edge of the ring at the juncture of the arm 17 with the part 16.

The part 16 is additionally provided at the outer edge of the cage ring and inwardly from the plane of its outer edge with the relatively short inwardly projecting lugs 19, thereby also forming the recess 20 in the outer edge of the ring between the adjacent ball recesses.

The other cage ring or section 14 is likewise formed with a series of ball receiving recesses or pockets adapted for arrangement in opposed relation to the complementary pockets 15 of the ring 13. Each of the ball pockets or recesses of the ring 14 consists of the opposed converging arcuate wall sections 21, the adjacent ends of which are connected by the flat rectangular section 22, the latter being positioned in a plane at right angles to the axis of the cage.

Figure 9:
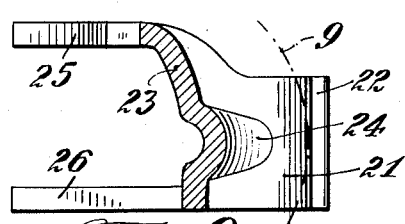
Fig. 9 is an enlarged detail section taken on the line 9—9 of Fig 8.

Parts 23 of the ring 14 connect the other or inner ends of sections 21 of adjacent ball pockets with each other, and are radially curved similar to the part 16 of the ring 13. It will be particularly noted from reference to Fig. 9 of the drawings that the sections 21 of the ball receiving pockets have their outer edges curved or inclined inwardly from parts 23 to the flat connecting sections 22, and that these sections 22 at the center of each of the ball receiving pockets is appreciably narrower than the connecting parts 23 between said pockets. In order to brace and reinforce these narrow side sections 21 of the ball pockets, I may provide the same and the connecting parts 23 with the ribs as indicated at 24.

Each of the parts 23 of the ring 14 at its outer edge is formed with the tapering arm 25 axially projecting from the inner side of the ring. A relatively narrow arm 26 also extends axially from the inner edge of each part 23.

In assembling the two rows of balls with the cages as shown in Fig. 1 of the drawings, the balls 9 are first assembled in the pockets or recesses of one of the cage ring sections 14 and together therewith are engaged with the race of the inner ring 5, and then the complementary cage ring section 13 is applied and the axially extending arms 25 and 26 of the ring section 14 engaged through the notches 20 and 18 respectively of the ring section 13, whereupon, by means of a suitable tool, said arms are bent inwardly towards each other upon the part 16 of the ring section 13. The assembled cage parts with the balls are now moved relative to the ring 5 until the balls are positioned upon the minimum diameter of the raceway 7. With the cage and balls in such position relative to the ring 5, the balls are then snapped into position within the ring 6 at one side thereof beyond the shoulder at the outer side of the raceway 8. After the balls are thus positioned relative to the outer ring 6, the two bearing rings are aligned with their side faces in the same plane, so that the balls with the assembled cage will then assume the proper position as shown at the left-hand side in Fig. 1 of the drawings.

From reference to the drawings, it will be observed that the ends of the arms 17 on cage section 13 are in abutting contact against the parts 23 of the ring 14 at the inner ends of the arms 26 on the latter, while the lugs 19 of the ring 13 are likewise in abutting contact with the parts 23 at the inner ends of arms 25. Thus, in this bending or clinching operation upon the arms 25 and 26, relative bodily movement of the cage ring sections towards each other which would result in binding frictional contact of the pocket walls thereof upon the bearing balls is obviated. When the two sections of the cage have thus been connected with each other between the several spaced ball receiving pockets, a high degree of rigidity and stiffness in the structure of the cage as a whole results. It will be noted from reference to Fig. 1, that each of these connections between the ring sections of the cage has a general ovoid outline contour, the longer axis of which is parallel to the plane of rotation of the rotary bearing ring or member. This connection has its maximum width at the inner side of the cage, while the narrowest part thereof is at the outer side of the cage. Thus there is attained an effective reaction in the cage structure against strain resulting from centrifugally developed forces tending to loosen the connection between the ring sections of the cage to such an extent as would permit of their relative movement.

After one row of balls with its cage has thus been assembled in one side of the bearing, the ring section 14 of the other cage is then inserted between the inner and outer bearing rings or members, said rings and the previously assembled cage being arranged upon a suitable support. With the portions 22 of said ring section 14 in contact with the corresponding portions of the opposed section of the supported cage, said ring section is turned to successively register the pockets thereof with the channels or notches 11 and 12 of the bearing rings, through which the balls 10 are inserted and snapped into the pockets of the cage ring section, and upon the opposed raceways 7 and 8. The other cage section 13 is now inserted in the manner above explained, and the tool applied to the arms 25 and 26 to bend the same inwardly upon the parts 16 between the ball pockets of the section 13. In this operation, advantage is taken of the slight clearance between the cage parts and the balls and the flexibility of the cage material, so that as soon as the tool is removed, the parts of the cage will spring back to normal condition, thus allowing suitable clearance between the parts 22 of the two cages, as well as clearance between the balls and the walls of the cage pockets, so that each cage, together with the balls assembled therein may independently rotate upon the respective raceways 7 and 8. Thus, a firm bearing support for the cage ring sections during the assembling operation is provided, so that the several connections between the cage sections may be quickly made without distortion of the parts of the cage from their predetermined accurate relation to the bearing balls, which permits of the free and unretarded individual rotation of said balls relative to the cage.

As indicated in Fig. 1 of the drawings by the broken lines thereon, the load center lines through the two series of balls are at reverse angles of approximately 30 degrees from the plane of rotation of the rotary bearing ring or member. While my improved bearing cage by reason of its construction as above explained particularly lends itself to easy application and use in connection with such double row ball bearings, it is, of course, understood that in view of the simplicity of my new cage structure, the practical advantages thereof and its comparatively low production cost, it may also be advantageously used in single row radial or angular contact type ball bearings.

From the foregoing description considered in connection with the accompanying drawings, the construction, manner of operation and several advantages of my invention as herein disclosed will be clearly and fully understood. While I have in more or less detail described the several parts of my new cage construction, it is evident that certain modifications of these details may be permissible without sacrifice of the essential advantages of my present disclosure. Accordingly, it is to be understood that the privilege is reserved of embodying the invention in such other alternative structural forms as may be fairly comprehended within the spirit and scope of the appended claims.

I claim:

1. A cage for ball bearings, comprising two ring sections having spaced ball receiving pockets, and means between adjacent pockets including mutually co-acting parts on said ring sections forming a rigid connecting structure of substantially ovoid form in radial cross section.

2. A cage for ball bearings, comprising two ring sections having spaced ball receiving pockets, and means between adjacent pockets including mutually co-acting parts on said ring sections forming a rigid connecting structure of substantially ovoid form in radial cross section, said structure having its major dimension disposed at right angles to the axis of the cage.

3. A cage for ball bearings, comprising two ring sections having spaced ball receiving pockets, and means between adjacent pockets including mutually co-acting parts on said ring sections forming a rigid connecting structure of substantially ovoid form in radial cross section, said structure having its maximum dimension axially of the cage at the inner side thereof.

4. A cage for ball bearings, comprising two ring sections having spaced ball receiving pockets, and means between adjacent pockets including mutually co-acting parts on said ring sections forming a rigid connecting structure of substantially ovoid form in radial cross section, said structure having its major dimension disposed at right angles to the axis of the cage and its maximum axial dimension at the inner side of the cage.

5. A cage for ball bearings, comprising two ring sections having spaced ball receiving pockets, means integral with the ring sections between adjacent pockets forming a rigid connecting structure between said ring sections, said structure including laterally spaced parts of the respective ring sections converging towards each other from the inner to the outer side of the cage.

6. A cage for ball bearings, comprising two ring sections having spaced ball receiving pockets, means integral with the ring sections between adjacent pockets forming a rigid connecting structure between said ring sections, said structure including laterally spaced parts of the respective ring sections converging towards each other from the inner to the outer side of the cage, and each of said parts at its inner and outer edges having axially extending projections, the projections of one ring section extending exteriorly over the projections of the other ring section and inwardly towards each other upon the outer side of the converging parts of the latter ring section.

7. A cage for ball bearings, comprising two ring sections having spaced ball receiving pockets, means integral with the ring sections between adjacent pockets forming a rigid connecting structure between said ring sections, said structure including laterally spaced parts of the respective ring sections converging towards each other from the inner to the outer side of the cage, and each of said parts at its inner and outer edges having axially extending projections, the projections of one ring section extending exteriorly over the projections of the other ring section and inwardly towards each other upon the outer side of the converging parts of the latter ring section, and said latter ring section at the juncture of the projections thereon with said parts being provided with recesses in its inner and outer edges receiving the projections on said first named ring section.

8. A cake for ball bearings, comprising two ring sections having spaced ball receiving pockets, parts integrally connecting the walls of adjacent pockets of each ring section with each other, said parts of one ring section at the inner and outer edges thereof having axially extending arms, and the said parts of the other ring section being provided with oppositely projecting axial extensions engaged between and with the arms of said first ring section, and said parts having recesses in their inner and outer edges to receive the arms of said first named ring section, and said arms being inwardly bent towards each other and upon the outer surfaces of said pocket connecting parts of the second named ring section.

9. A cage for ball bearings, comprising two ring sections having spaced ball receiving pockets and cooperatively engaged means integral with the ring sections between said pockets rigidly connecting the said sections with each other, the pocket walls of one ring section having central flattened portions disposed in a common plane at right angles to the axis of the cage, and adapted for temporary bearing contact with the corresponding portions of the pocket walls of a second cage in assembling the sections of the latter cage with the balls in a double row ball bearing.

10. A cage for ball bearings, comprising two rings each having spaced radially and circumferentially curved wall sections forming ball receiving pockets and wall sections connecting the pocket forming wall sections, and radially curved substantially in concentric relation to the latter, and bendable projections on the inner and outer edges of the pocket connecting sections of one ring adapted to extend axially thereof in alignment with the inner and outer edges of the pocket wall sections of the other ring and adjustable into parallel contacting relation with the outer sides of the pocket connecting sections of the latter ring to thereby rigidly connect the cake rings with each other.

11. A cage for ball bearings, comprising two rings each having spaced radially and circumferentially curved wall sections forming ball receiving pockets and wall sections connecting the pocket forming wall sections, and radially curved substantially in concentric relation to the latter, said pocket connecting sections of one ring being provided with recesses in their inner and outer edges, and bendable projections on the inner and outer edges of the pocket connecting sections of the other ring adapted to extend axially through said recesses and in alignment with the inner and outer edges of the pocket wall sections of the first named ring, and adjustable into parallel contacting relation with the outer sides of the pocket connecting sections of said first named ring to thereby rigidly connect the cage rings with each other.

12. A cage for ball bearings, comprising two rings having spaced circumferentially and radially curved ball receiving pockets and means for rigidly connecting the said rings with each other, the pocket walls of one ring each being provided centrally thereof with an outer flattened surface, said flattened surfaces being disposed in a common plane at right angles to the axis of the cage and adapted for temporary bearing contact upon the corresponding flattened pocket wall surfaces of a second cage in assembling the rings of the latter cage with the balls in a double row ball bearing.

GUSTAV EGE.